No. 871,882. PATENTED NOV. 26, 1907.
T. W. MORGAN.
CENTRIFUGAL CREAM SEPARATOR.
APPLICATION FILED AUG. 30, 1906.

WITNESSES:
J. F. Albrett
C. M. Jensen

INVENTOR
Thomas W. Morgan,
BY
G. C. Kennedy,
ATTORNEY

UNITED STATES PATENT OFFICE.

THOMAS W. MORGAN, OF WATERLOO, IOWA, ASSIGNOR TO WILBUR W. MARSH, OF WATERLOO, IOWA.

CENTRIFUGAL CREAM-SEPARATOR.

No. 871,882.     Specification of Letters Patent.     Patented Nov. 26, 1907.

Application filed August 30, 1906. Serial No. 332,645.

*To all whom it may concern:*

Be it known that I, THOMAS W. MORGAN, a citizen of the United States of America, and a resident of Waterloo, Blackhawk county, Iowa, have invented certain new and useful Improvements in Centrifugal Cream-Separators, of which the following is a specification.

My invention relates to centrifugal cream separators, and the object of my invention is to provide such milk-exits for the skimmed milk as will more efficiently promote an equal flow or current of such skimmed milk to each of the said milk-exits, and prevent any partial diversion of the streams to any one exit. This object I have accomplished by the means which are hereinafter described and claimed, and which are illustrated in the accompanying drawings, in which—

Figure 1:
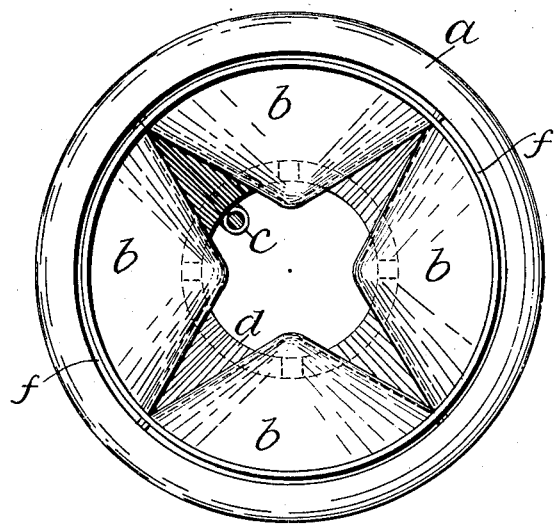
Figure 2:
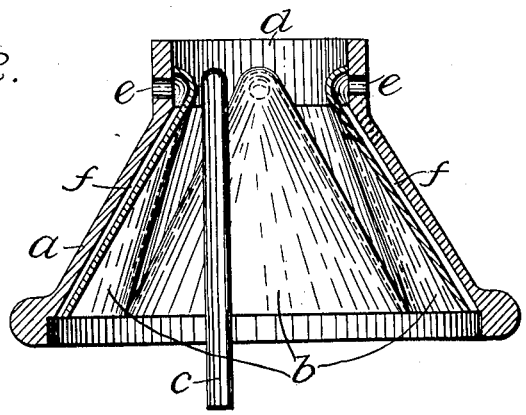

Figure 1 is an under plan view of the cover of a centrifugal cream separator bowl provided with my improved form of skimmed-milk-exits, and Fig. 2 is a central axial vertical section of said cover.

Similar characters of reference refer to similar parts throughout the several views.

*a* is a removable cover for a centrifugal cream separator bowl, of a well-known type, and provided with a hollow conical top having an upper cylindrical ring *d*, the latter having radial milk-exits *e*, and also a cream-exit in communication with a depending cream-exit-tube *c*, the latter projecting downward a sufficient distance so as to afford a passage therethrough for separated cream.

Attached along their tops and their oblique edges to the interior surfaces of the truncated cone *a* and ring *d*, so that the milk-exits *e* may communicate with their upper parts, are the skimmed-milk-conduits *b*. The lower edges of these conduits *b* are spaced away from said cover a sufficient distance as are their triangular arched portions so as to provide interspaces *f* between them and said cover in communication with the milk-exits *e*. The lower corners of said milk-conduits are in contact, and thus the lower portions of the spaces *f* are virtually continuous around the lower part of the cover *a*. The object of thus rendering such milk-conduits continuous is to allow delivery at all points along the upper edge of the inner circumferential periphery of the bowl. When milk-conduits for the delivery of the skimmed milk are used, such conduits being mere tubes of equal diameter throughout, and opening at widely separated points, when the separator bowl has been set in rotation, a current is liable to arise within such bowl which becomes particularly directed to one or more of such milk-exits, and, which thus obstructs the delivery of the remainder of the milk-exits, and retards the process of separation of the cream from the milk within the bowl. My improvement, as stated, prevents this retardation of the delivery and separation, because the lower ends of the milk-conduits *b* are contiguous but separated thereabove in their communication with the interior of the bowl, and no current can cross to obstruct the delivery of any one milk-exit, and the flow is rendered uniform through all the exits.

Having described my invention, what I claim as new, and desire to secure by Letters Patent, is—

1. In a centrifugal cream separator, a bowl-cover having a plurality of milk-exits, and a separate conduit for each milk-exit, the receiving openings of said conduits being separated but contiguous, and of equal area.

2. In a centrifugal cream separator, a bowl-cover having a plurality of milk-exits, and a separate conduit for each milk-exit, each conduit being widest at its receiving opening, and such receiving-openings of said conduits being contiguous to one another around the inner periphery of said cover.

Signed at Waterloo, Iowa, this 11th day of Aug. 1906.

THOMAS W. MORGAN.

Witnesses:
   M. E. KENNEDY,
   G. C. KENNEDY.